Aug. 3, 1954    W. A. CASKIE    2,685,353
TELESCOPIC STRUCTURE
Filed Nov. 13, 1950    2 Sheets-Sheet 1
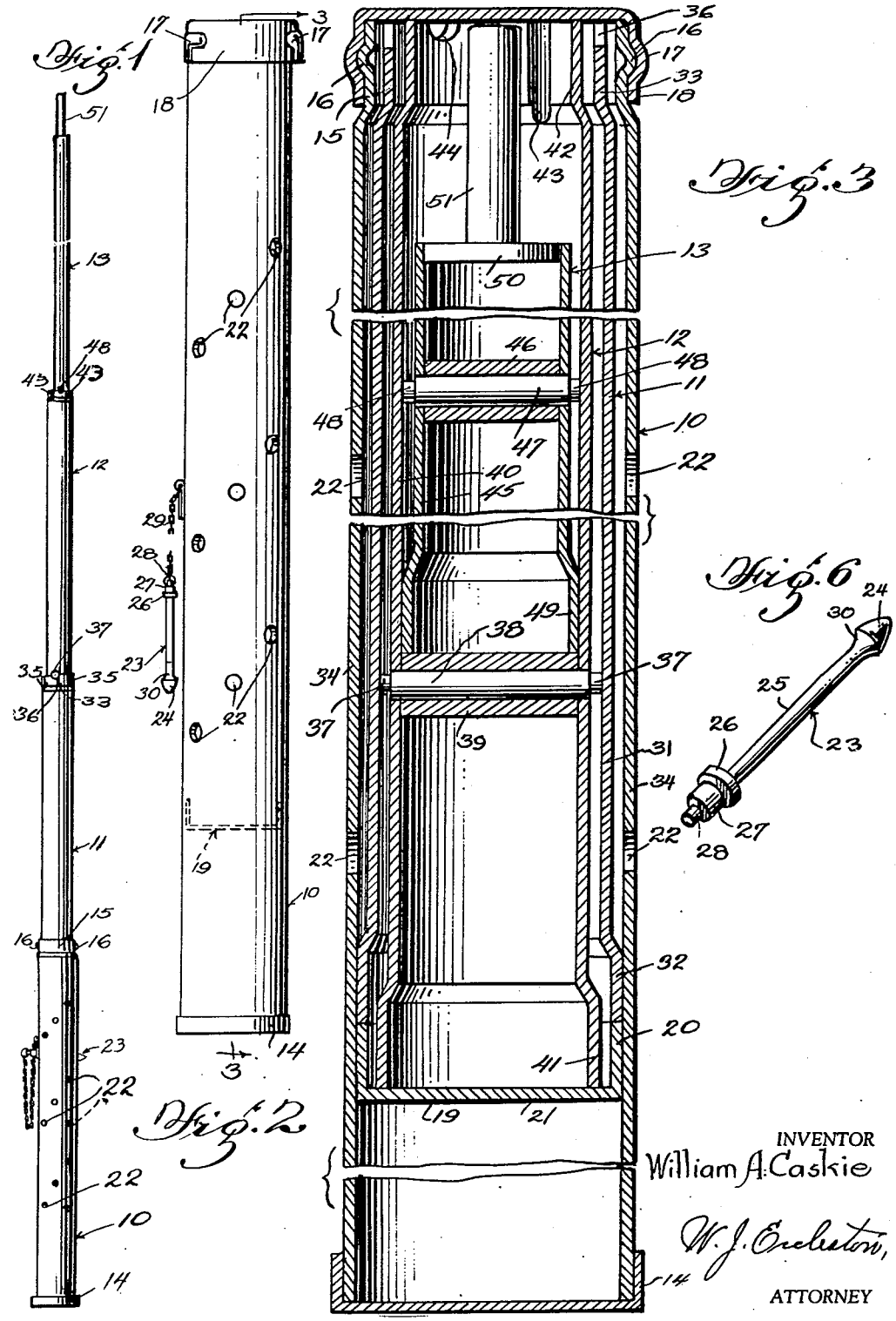
INVENTOR
William A. Caskie
W. J. Eccleston,
ATTORNEY Aug. 3, 1954 W. A. CASKIE 2,685,353
TELESCOPIC STRUCTURE
Filed Nov. 13, 1950 2 Sheets-Sheet 2

INVENTOR
William A. Caskie
BY
W. J. Eccleston
ATTORNEY

Patented Aug. 3, 1954

2,685,353

UNITED STATES PATENT OFFICE 2,685,353

TELESCOPIC STRUCTURE

William A. Caskie, Louisville, Ky., assignor to the United States of America as represented by the Secretary of the Army Application November 13, 1950, Serial No. 195,443

1 Claim. (Cl. 189—26)

(Granted under Title 35, U. S. Code (1952), sec. 266)

The invention described herein, if patented, may be manufactured and used by or for the Government for governmental purposes, without the payment to me of any royalty thereon.

My invention relates to telescopic structures and preferably to telescopic tubular structures wherein two or more tubular members are slidably interfitted for telescopic movement to and from extended and collapsed positions. Such structures are well known and have a multitude of uses. All of such structures include some means for locking the individual tubular structures or sections in either the extended or collapsed position or in both.

The telescopic structure of the invention is adapted for use in all climates, indoors or out, and is intended to provide the maximum strength with a minimum of weight. These requirements necessitate the use of lightweight, thin-walled tubing to achieve the weight and strength requirements. To achieve the all-climatic requirements, the structure must not only be corrosion resistant to a high degree, but must eliminate locking means which would be likely to fail in extreme temperatures.

For instance, the extremely low winter temperatures of the Arctic and Antarctic regions precludes the use of spring latches as the springs thereof not only may lose their resiliency but are also susceptible of being fouled by snow or ice. Likewise, the structure must be formed with a minimum of openings through the walls thereof as such openings will not only weaken thin-walled tubing but will permit the entrance of snow which might prevent or restrict proper operation of the device. Also, where the device is to be used in such regions, it must be capable of being extended or collapsed by personnel wearing gloves, mittens or the like.

With the foregoing in view it is an object of my invention to provide an improved telescopic structure of the class described.

A further object is to provide in such a structure, improved means for locking the device in at least the extended position.

A further object is to provide in such a structure, a tubular section having at one end a neck of reduced diameter, a second tubular section having a body portion formed for a sliding and rotatable fit in said neck, a rigid cross pin carried by the second tubular section adjacent the inner end thereof and protruding radially outwardly of opposite sides, a pair of longitudinally extending grooves formed in said neck to receive the free ends of said pin and permit the passage thereof through said neck, and a pair of notches in the free edge of said neck in offset relation to said grooves to seat said free ends of said pin and support said second tubular section in an extended position.

A further object is to provide a telescopic structure including a hollow base section, a second section slidable in the first section to and from extended and collapsed positions, said first section being formed with at least a pair of opposed holes therethrough, a supporting pin slidable through said holes so as to engage the inner edge of the second section and prevent relative collapsing movement of said sections, and said pin being formed to provide means for resisting but not preventing its withdrawal from said holes.

A further object is to provide in a structure such as that last described, a third section slidable in said second section, and non-resilient means for releasably locking said third section in an extended position relative to said second section.

Other objects and advantages reside in the particular structure of the invention, the structure of the several elements of the same, combinations and subcombinations of such elements, all of which will be readily apparent to those skilled in the art upon reference to the attached drawing in connection with the following specification wherein the invention is shown, described and claimed.

In the drawing:

Figure 1 is an elevational view of a structure embodying the invention, the parts being shown in an extended position;

Figure 2 is a like view on an enlarged scale, the parts being shown in the fully collapsed position;

Figure 3 is a longitudinal vertical sectional view on a further enlarged scale and taken substantially on the plane of the line 3—3 of Figure 2;

Figure 6 is a perspective view of the supporting means of Figure 5; and

Figure 5:
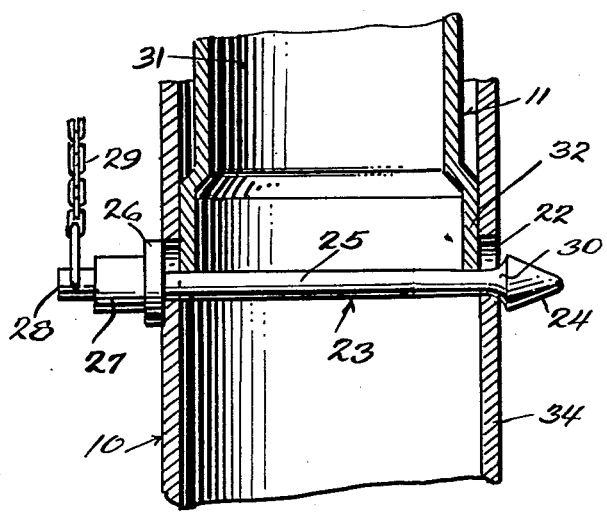
Figure 5 is a fragmentary vertical sectional view showing the means for supporting an inner section in an extended position relative to the base section.
Figure 4:
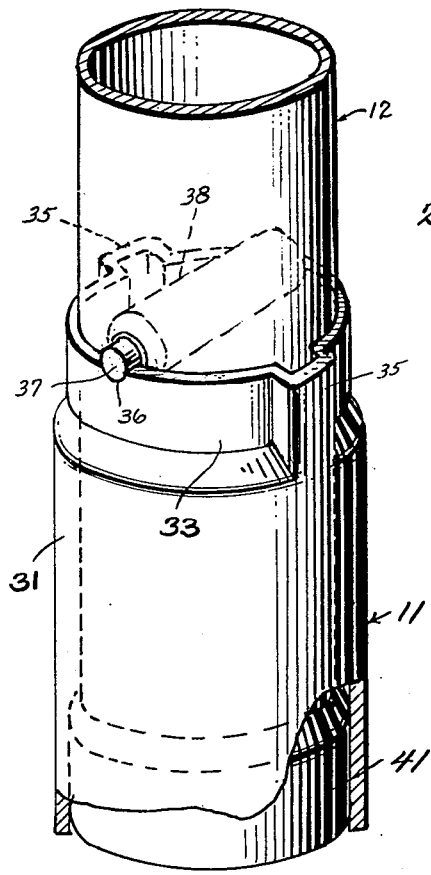
Figure 4 is a fragmentary perspective view, parts being broken away and shown in vertical section, showing the means for supporting certain of the sections in the extended position.
Figure 7:
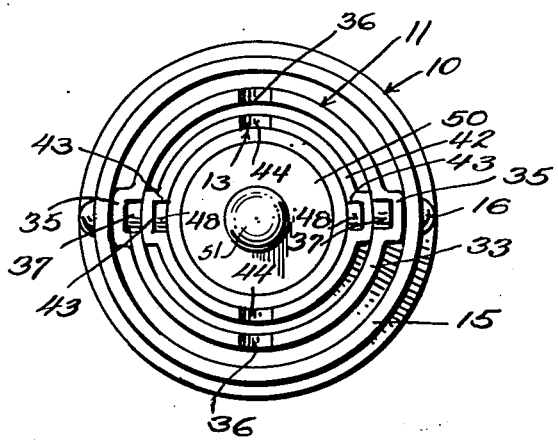
Figure 7 is a plan view of the collapsed structure with the closure cap removed.

Referring specifically to the drawing, wherein like reference characters have been used throughout the several views to designate like parts, and referring at first to Figure 1, 10 designates generally a base section for the structure. The base section 10 is intended to receive the other sections therein whereby it also comprises a carrying case for them.

In the embodiment illustrated, the structure comprises the base section 10, a second section 11, a third section 12 and a fourth section 13. However, it should be understood that the structure may comprise any desirable number of sections.

The base section 10 is closed at its lower end by any suitable means such as the cap 14 which is secured in place by any suitable means.

The open upper end of the section 10 is formed with a reduced neck or end sleeve 15 opposite sides of which are formed with lugs 16 to fit bayonet slots 17 formed in a cap 18 which thereby forms a detachable closure for the upper end of the section 10 after the sections 11, 12 and 13 have been collapsed thereinto. The section 10 may be provided also with an internal brace in the form of a cup 19. The cup 19 is located slightly above the cap 14 and is fixed in position in any suitable manner. The cup 19 includes a floor 21 and a side wall 20 which, as will appear later support the sections 12 and 11 in the collapsed position. If desired, the cup 19 may be dispensed with, particularly if the sections 11 and 12 are proportioned otherwise than as shown so as to be supported on the floor of the end cap 14 when collapsed.

In the embodiment illustrated, to support the section 11 in an extended position, the side wall of the body portion of the base section 10 is formed with at least a pair of opposed holes 22. In this embodiment, and to permit adjustments in the length of the extended structure, there has been provided a plurality of pairs of holes 22 which are arranged spirally, Figure 1, and which extend substantially the entire length of the section 10. The holes 22 are adapted to receive a supporting or adjusting pin 23 which engages the lower edge of second section 11 whereby to limit relative collapsing movement of the sections 10 and 11, as best seen in Figure 5.

As best seen in Figures 5 and 6, the pin 23 includes a pointed front end 24 having a maximum diameter slightly smaller than the diameter of the holes 22, a central section 25 of lesser diameter, and a rear end which includes an annular shoulder 26 having a diameter greater than that of said holes 22. The rear end of the pin 23 may also include a finger grip portion 27 rearwardly of the shoulder 26 and a stud or eye 28 for attaching the pin to any suitable flexible tethering device 29 for securing the pin to the section 10. In this connection it should be understood that the tethering device 29 is of sufficient length to permit the pin 23 to be inserted in any selected pair of holes 22. An important feature of the pin 23 is that the central section 25 thereof merges with the head 24 by means of an annular, beveled shoulder 30 of substantially frustro-conical form. This shoulder 30 bears against the outside edge of a hole 22 when the pin is in the operative position of Figure 5 and resists withdrawal of the pin 23 from the hole without actually preventing withdrawal of the pin. However, as the pin 23 when in use is supporting the entire weight of the sections 11, 12 and 13, it is obvious that the shoulder 30 will prevent accidental withdrawal of the pin 23 from its operative position.

The second section 11 comprises a cylindrical body portion 31 which is sized to have a sliding and rotating fit in the neck 15 of the base section 10. The inner or lower end of the section 11 is outwardly belled as at 32 so as to have a sliding and rotating fit in the body portion 34 of the base section 10. As clearly shown in Figure 3, the lower edge of the belled end 32 may seat on the free edge of the wall 20 of cup 19 to limit collapsing movement of the second section 11 to a point where the free upper edge of the second section will abut the inner surface of the closure cap 18 whereby to prevent relative axial movement of the sections 10 and 11 when collapsed. The upper or outer end of the section 11 is reduced to provide a neck or end sleeve 33. The sleeve 33 has opposite portions thereof outwardly drawn or otherwise formed to provide opposed, parallel, straight grooves 35 which are open at each end for the free passage therethrough of the free ends 37 of pins 38. The free edge of the neck 33 is likewise formed with a pair of oppositely disposed notches 36 in which the pin ends 37 may be seated after passage through the grooves 35. The notches 36 are offset from the grooves 35 whereby the pin ends 37 are seated in the notches by a partial relative rotation of the section 11 and the third section 12 in which the pin 38 is mounted as will be explained more fully hereinafter.

The pin 38 is mounted in the third section 12 by being fixed in a disc 39 which in turn is fixed in the lower part of the body portion 40 of the section 12. The lower end of the body portion 40 is outwardly belled as at 41 for a sliding and rotating fit in the body portion 31 of the second section 11. As shown in Figure 3, the lower belled end 41 of the section 12 may rest on the floor 21 of the cup 19 when the sections are collapsed. The body portion 40 is sized for sliding and rotating fit in the neck or sleeve 33 of the second section 11. The upper end of the third section 12 is formed with a reduced neck or end sleeve 42 which in turn is formed with a pair of opposed grooves 43 and an offset pair of edge notches 44 which correspond to the grooves 35 and notches 36 of the section 11 aforesaid.

The fourth section 13 has a body portion 45 the lower part of which has fixed therein a disc 46 in which is fixed a cross pin 47. The ends 48 of the cross pin 47 extend outwardly of the body portion 45 for passage through the grooves 43 and eventual seating in the notches 44 in the manner previously described with respect to the pin ends 37. The lower end of the section 13 is outwardly belled as at 49 for a sliding and rotating fit in the body portion 40 of the section 12. The body portion 45 is sized for a sliding and rotating fit in the sleeve 42 of the section 12. The upper end of the body portion 45 is closed by a plug 50 which is fixed therein. Inasmuch as the structure illustrated is for a tent pole, the plug 50 fixedly mounts the usual tent-engaging spindle 51.

As best seen in Figure 3, the several sections are so proportioned that when they are collapsed, the upper ends of the three inner sections bear against the inner surface of the closure cap 18 whereby relative endwise movement of the collapsed sections and the resultant rattling thereof is prevented during transport. As aforesaid, the lower ends of the sections 11 and 12 are supported on the cup 19. The lower end of the section 13 is supported on the disc 39 of the section 12. Such support for the lower end of the section 13 is desirable, but as aforesaid, it may be desirable to eliminate the cup 19 whereby the sections 11 and 12 would be proportioned to be supported on the bottom cap 14 when in the collapsed position.

Where length adjustment is not a factor, the holes 22 of base section 10 may be eliminated together with adjusting pin 23. In such instance, neck 15 is formed with grooves and notches corresponding to grooves 35, 43 and notches 36, 44 aforesaid while section 11 is provided with a pin corresponding to pins 38 and 47.

Also, while it is essential that the sections 11, 12 and 13 be relatively rotatable as well as slidable, it is not essential with respect to the sections 10 and 11. Thus, as long as a sliding relation is maintained between the sections 10 and 11, the rotating relation may be eliminated by forming the base section 10 and belled lower end 32 of the section 11 of non-circular cross section. Of course, the body portion 31 and neck 33 of the section 11 must be of circular cross section in any event.

It is apparent from the foregoing that except for the holes 22, (which may be eliminated as aforesaid in a proper instance) none of the sections have openings through the walls. Also, it is apparent that the means for maintaining the sections in the extended or collapsed positions do not require springs and may be readily operated by gloved personnel.

Thus, while I have shown and described what are now thought to be the preferred embodiments of my invention, it is to be understood that the same is susceptible of other forms and expressions. Consequently, I do not limit myself to the precise structures shown and described hereinabove except as hereinafter claimed.

I claim:

In a telescopic structure wherein an inner member is slidable in a tubular outer member and wherein the latter is formed with at least a pair of opposed adjusting pin holes; the improvement comprising an adjusting pin insertable in said holes across said tubular outer member to provide a support for said inner member, said pin having front and rear ends, at least said front end being sized to pass freely through said holes, said pin having a central section of lesser diameter than said ends to provide front and rear spaced and opposed shoulders, said shoulders being spaced sufficiently to lie outwardly of said tubular outer member when said pin is seated thereacross, at least said front shoulder being of frustro-conical configuration to resist withdrawal of said pin through said holes, and said central section and front shoulder being circular in cross section.

References Cited in the file of this patent

UNITED STATES PATENTS

| Number | Name | Date |
|---|---|---|
| 919,925 | McWhorter | Apr. 27, 1909 |
| 958,066 | Anderson | May 17, 1910 |
| 1,360,344 | Wood et al. | Nov. 30, 1920 |
| 1,669,611 | Goldberg | May 15, 1928 |
| 2,354,806 | Fletcher | Aug. 1, 1944 |
| 2,427,841 | Dichter | Sept. 23, 1947 |
| 2,496,264 | Benson | Feb. 7, 1950 |